United States Patent [19]
Druckman et al.

[11] Patent Number: 6,109,925
[45] Date of Patent: Aug. 29, 2000

[54] SYSTEM AND METHOD FOR MOTIVATING AND REINFORCING LEARNING USING A REWARD BASED LEARNING TOY

[75] Inventors: Gil Druckman, Tel Aviv; Danny Hershkovitz, Ramat-Gan, both of Israel

[73] Assignee: Tiger Electronics, Ltd., Pawtucket, R.I.

[21] Appl. No.: 09/245,236

[22] Filed: Feb. 5, 1999

[51] Int. Cl.⁷ .............................. G09B 19/00; G09B 3/00
[52] U.S. Cl. ........................................... 434/236; 434/332
[58] Field of Search ................................... 434/322, 323, 434/327, 332, 362, 236

[56] References Cited

U.S. PATENT DOCUMENTS

| | | |
|---|---|---|
| 2,742,713 | 4/1956 | Villenueva . |
| 2,855,703 | 10/1958 | Stanton . |
| 3,315,373 | 4/1967 | Diamond . |
| 3,546,791 | 12/1970 | Koos et al. . |
| 5,056,019 | 10/1991 | Schultz et al. . |
| 5,690,495 | 11/1997 | Collier . |
| 5,725,382 | 3/1998 | Walter et al. . |
| 5,759,101 | 6/1998 | Von Kohorn ............................. 463/40 |
| 5,875,796 | 3/1999 | Silver-Isenstadt et al. ............. 132/311 |
| 5,971,850 | 10/1999 | Liverance ................................. 463/23 |

*Primary Examiner*—Robert A. Hafer
*Assistant Examiner*—John Edmund RoVnak
*Attorney, Agent, or Firm*—Fitch, Even, Tabin & Flannery

[57] ABSTRACT

A hand held electronic learning toy apparatus that reinforces learning by a user, such as a child, and provides motivation to the user to continue using the learning toy by enabling the user to interact with a plurality of game functions through one or more pre-programmed educational games and activities. The learning toy apparatus provides a tangible reward in the form of a colorful and/or interesting sticker when a question or query is answered correctly during the course of game play. Each sticker has an image of a single object, such as a star, ball, balloon, or the like, or includes indicia that is one segment of a larger picture wherein many stickers must be collected and pieced together to form the entire picture, much like a puzzle. Templates are provided that include indicia corresponding to the indicia of each sticker to indicate the proper placement of each sticker on the template.

18 Claims, 12 Drawing Sheets

SYSTEM AND METHOD FOR MOTIVATING AND REINFORCING LEARNING USING A REWARD BASED LEARNING TOY

BACKGROUND OF THE INVENTION

1. Field of the Invention

The present invention relates to learning and, more particularly, a learning toy having a reward system to provide motivation and reinforce learning in a user by providing stickers in response to correctly answered problems and questions.

2. Description of the Prior Art

Children, although having a great capacity for learning, are not always motivated to learn. Instead, they would rather do what they love most, which is play. In light of such innate behavior, prior art learning toys have been developed that attempt to provide learning games that children find interesting and fun to play. A factor that helps motivate children to learn from and interact with learning toys is the promise of a reward when a question or task is completed successfully. In prior art learning toys and, in particular, electronic learning toys, the reward is generally an interesting or funny sound and/or graphic on a display screen, sometimes followed by a voice message on a speaker congratulating the child for a job well done. Unfortunately, visual and a child's interest in the learning device and also may not be enough to motivate a child to continue using the learning device in the future. Furthermore, the sound effects for an incorrect answer are sometimes more pleasing or interesting to the ears of the child and may cause the child to repeatedly enter incorrect answers.

Thus, what is needed, is a system that captures a child's imagination and fosters a child's desire to keep using the learning device and to enter correct answers by providing a reward that leads to additional interesting and fun-filled activities, which may advantageously also provide additional learning opportunities.

SUMMARY OF THE INVENTION

Briefly, the present invention relates to a hand held electronic learning toy apparatus that reinforces learning by a user, such as a child, and provides motivation to the user to continue using the learning toy by enabling the user to interact with a plurality of game functions through one or more pre-programmed educational games and activities and providing a tangible reward when a question or activity is completed successfully. A particular advantage of the learning toy apparatus is that the reward system dispenses a colorful and/or interesting sticker when a question or query is answered correctly during the course of game play. Each of the stickers has an image of a single object, such as a star, ball, balloon, or the like. Alternatively, each of the stickers includes indicia that is one segment of a larger picture wherein many stickers must be collected and pieced together to form the entire picture, much like a puzzle. Templates, which are provided to assist the child in piecing together the picture, include indicia corresponding to the indicia of each sticker to indicate the proper placement of each sticker. To use the learning toy, the child selects a game and answers a series of questions. Upon answering a predetermined number of the questions correctly, the apparatus automatically dispenses a sticker.

The apparatus includes the ability to enable a child to choose one of several built in activities by pressing a button on the apparatus and then entering a game number. During the play of the selected game, if the child is in the middle of an activity and wants to change the activity, the child may press the game button again and enter another number, thereby moving onto a different game. The games that are available, among others, include number games, letter games, musical games and pattern and shape recognition activities.

DESCRIPTION OF THE DRAWINGS

The invention is pointed out to a particularity in the appended claims. However, other features will become more apparent, and the invention will be best understood by referring to the following detailed description in conjunction with the accompanying drawings, in which:

DETAILED DESCRIPTION

Figure 1A:
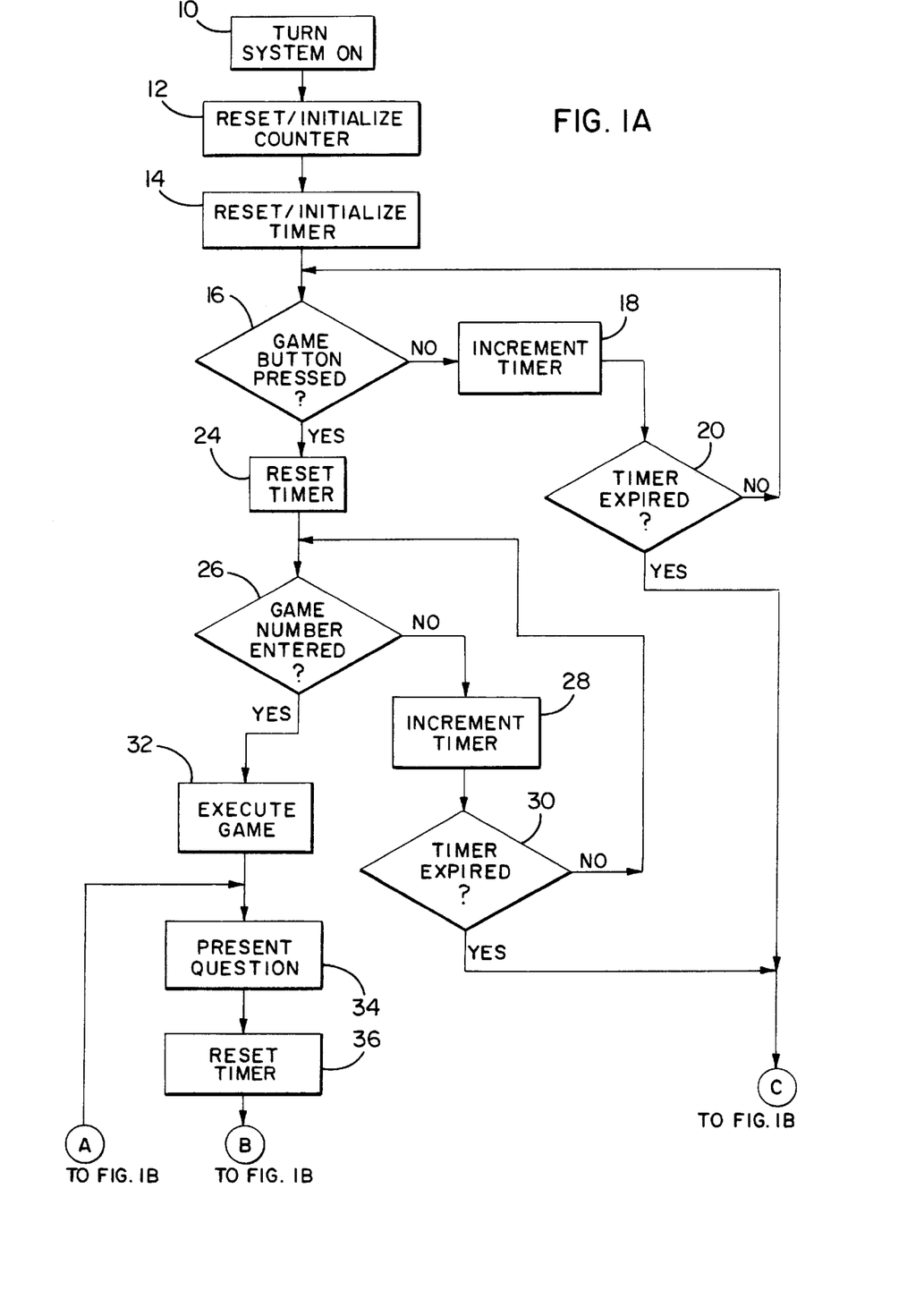
FIGS. 1A–1B are a flows chart illustrating a method of operating a learning toy in accordance with an embodiment of the present invention.
Figure 1B:
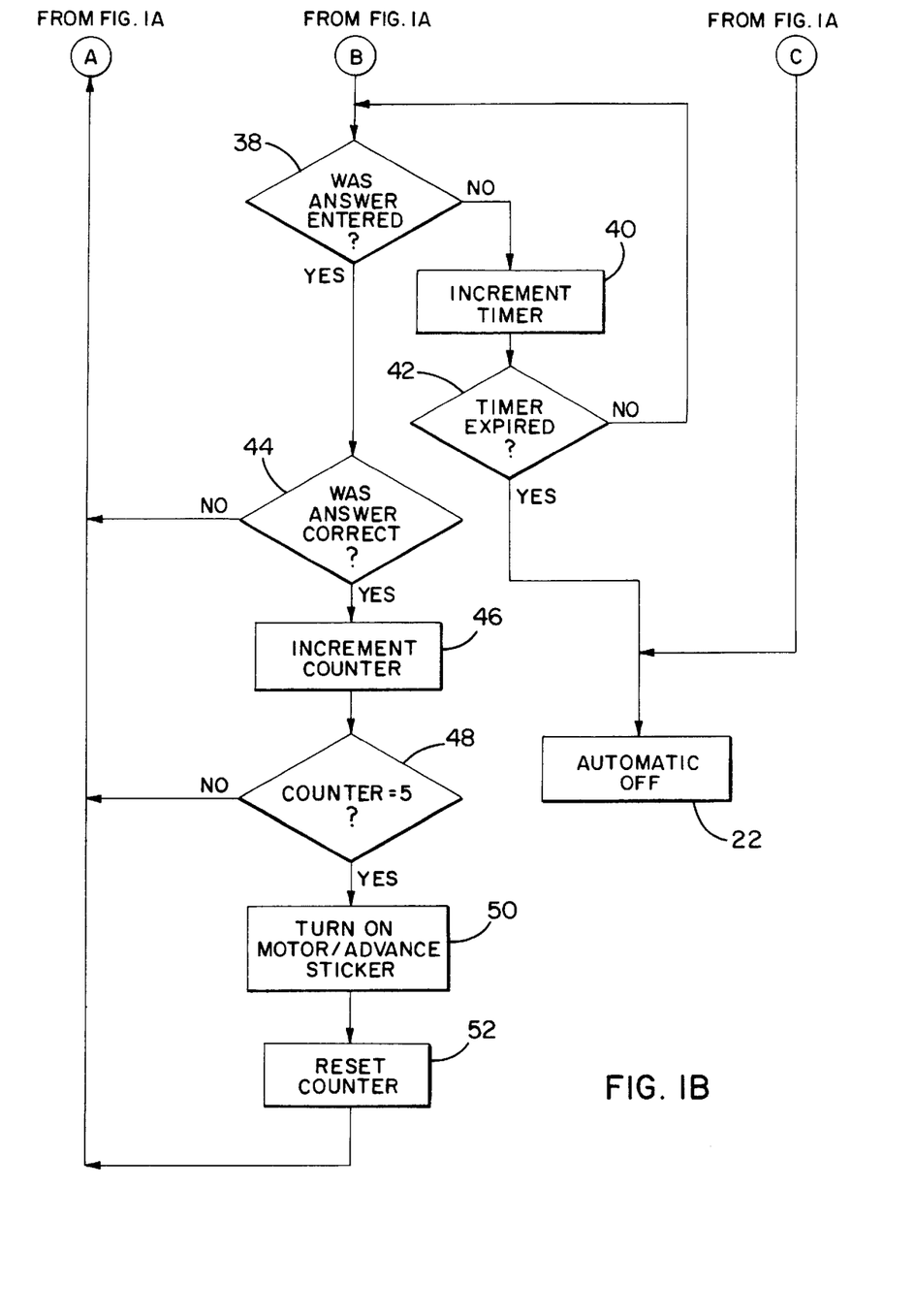

Turning now to the drawings, and in particular to FIGS. 1A–1B, there is illustrated a flow chart diagram describing the operation of the learning toy apparatus in accordance with an embodiment of the present Invention. In step 10, the child presses the "power" or "on" button and energizes the system. In step 12, a counter is initialized and started. In step 14, an optional timer is initialized and started as well. In step 16, the system waits for a game select button to be pressed. If the game select button is not pressed immediately, the timer is incremented in step 18. In step 20, the apparatus determines whether the timer expired. If so, then in step 22, the system turns off. However, if the timer did not expire, then the system returns to step 16 to wait for a press of the game button. If the game select button in step 16 is pressed within a predetermined time, the timer is reset in step 24 and the apparatus determines whether the number of a particular game was entered after the game select button was pressed. If the game number is not entered within a predetermined time period, the timer is incremented in step 28. In step 30, the apparatus determines whether the timer expired. If so, then the system turns off in step 22. However, in step 26 the game number was entered, then the apparatus begins execution of the particular game desired in step 32.

In step 34, the apparatus presents a question or problem that is to be answered by the child. In step 36, the timer is reset and started to measure the amount of time taken by the child to respond to the presented question. In step 38, the apparatus determines whether the question of step 34 is answered. If an answer is not entered in a predetermined amount of time, the system increments the timer in step 40. In step 42, the apparatus determines whether the timer expired. If so, then the system turns off in step 22. If the answer is entered within the specified time, then in step 44 the system determines whether the entered answer is correct. If the answer is not correct, the system returns to step 34. However, if the child is able to correctly answer the question, then in step 46 the counter is incremented to keep track of the number of correct answers entered by the child. The system in step 48 checks the counter to determine whether a predetermined number of correct answers have been entered. If not, the system returns to step 34 and once again presents the child with a question. However, if it is determined that the child answered a predetermined number of questions correctly, for example 5, then in step 50 the system turns on a motor for a set amount of time. The motor causes a roll of stickers in the learning toy apparatus to turn a particular amount, thereby dispensing a sticker from within the apparatus. In step 52, the counter is reset and the apparatus returns to step 34. It is to be noted that the child may press the game button at any point and change the particular topic or game being played. An advantage of the present invention is that the counter is not reset upon pressing of the game button, thereby enabling a child to answer 5 questions from various game topics to be answered and still enable a sticker to be awarded.

The child is able to choose one of several built-in activities by pressing the game button, as discussed above. Several examples of representative games and activities are discussed below. It is to be noted that other game scenarios are also available and that the invention is not to be limited to only the following examples.

In a simple math activity, the learning toy apparatus displays, for example, one ball, a plus sign, one ball and an equal sign. The child must then enter the number "2".

In a counting activity, the apparatus displays one ball, another ball, and still another ball. The child is then required to count the balls as they appear and type in the total number of counted balls.

In an alphabet activity, the apparatus says a letter and the child must type in the spoken letter. Similarly, in a number game, the unit says a number and the child must type in the spoken number.

In a letter activity, the apparatus displays a lower case "h" and the child is required to find and type in the upper case "H".

In a spelling activity, the apparatus shows a picture of a cow and then spells the word. The word then disappears and the child is required to type it in correctly In a missing letter activity, the apparatus shows a picture of a dog and the word appears with one letter missing. The child is required to enter the correct letter or choose from three letters at the bottom of the screen.

In a first letter activity, a picture appears and the apparatus says the word for the picture. The child is then required to enter the first letter of that word. Similarly, in a last letter activity, the child must enter the last letter of that word.

In an alphabet "yes" or "no" activity, the apparatus says the letter of the alphabet and a picture appears. If the picture begins with the letter the apparatus said, the child must press the "yes" button. If the picture does not begin with the displayed letter, the child must press "no".

In an addition activity, the apparatus displays a word and a picture. If the word matches the picture, the child is to press the "yes" button. If the word does not match the picture, the child must press the "no" button.

In a musical activity, the child creates his own song or plays one of a number of built-in songs.

In a sight words activity, the learning of sight words is reinforced. Sight words are words such as "the", "and", etc. These words are briefly flashed on the screen and then disappear. The child must then remember the word and type it in.

In a "which one is different" type game, three objects appear on the screen. The child is then required to determine the object that is different and enter the appropriate number or letter. For example, two letters and a number will appear on the screen. The child must enter the number as the item that is different. Alternatively, three alphabetically or numerically labeled pictures appear, such as an apple, a banana and a chair. The child must enter the number by the chair as the item that is different.

In a pattern activity, a pattern of letters and/or numbers appears on the screen with the last portion of the pattern missing. The child must complete the pattern by entering the correct letters or numbers.

Figures 2A, 2B:
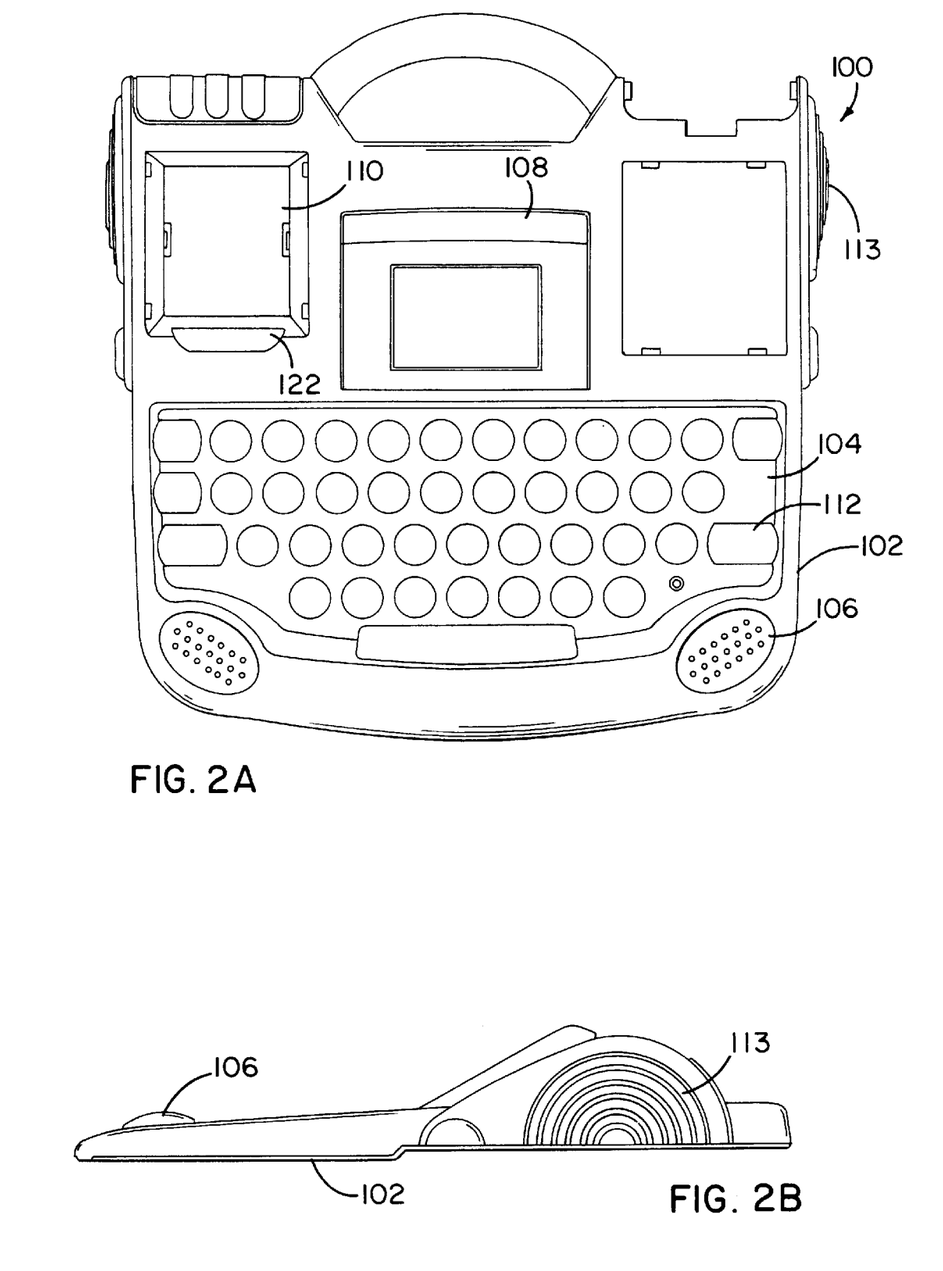
FIGS. 2A–2B are top and side views respectively of the electronic learning toy.

Referring to FIG. 2A, a learning toy apparatus according to the invention is shown generally as reference numeral 100. The apparatus 100 includes a housing 102 with a keyboard 104 for user input, a liquid crystal display (LCD) 108, a speaker 106 and sticker dispenser aperture 110. The learning toy 100 is lightweight and small enough to where a keyboard button may comfortably be pressed by a child. The keyboard 104 is a typewriter style keyboard having a row of number across the top and the letters of the keyboard are in the standard "QWERTY" format. The enter key 112 is depressed to enter all choices, such as when the user types in an answer or to select other options. Program output is directed to the LCD display 108 in the form of graphics and text messages or display as part of game play and/or as a reward. The speaker 106 is provided for audio output also as part of the game play and as part of the reward system. The housing 102 also includes a compartment (not shown) for receiving one or more batteries for supplying power to the apparatus. A power switch 103 is provided to turn the apparatus on and off.

Figure 3:
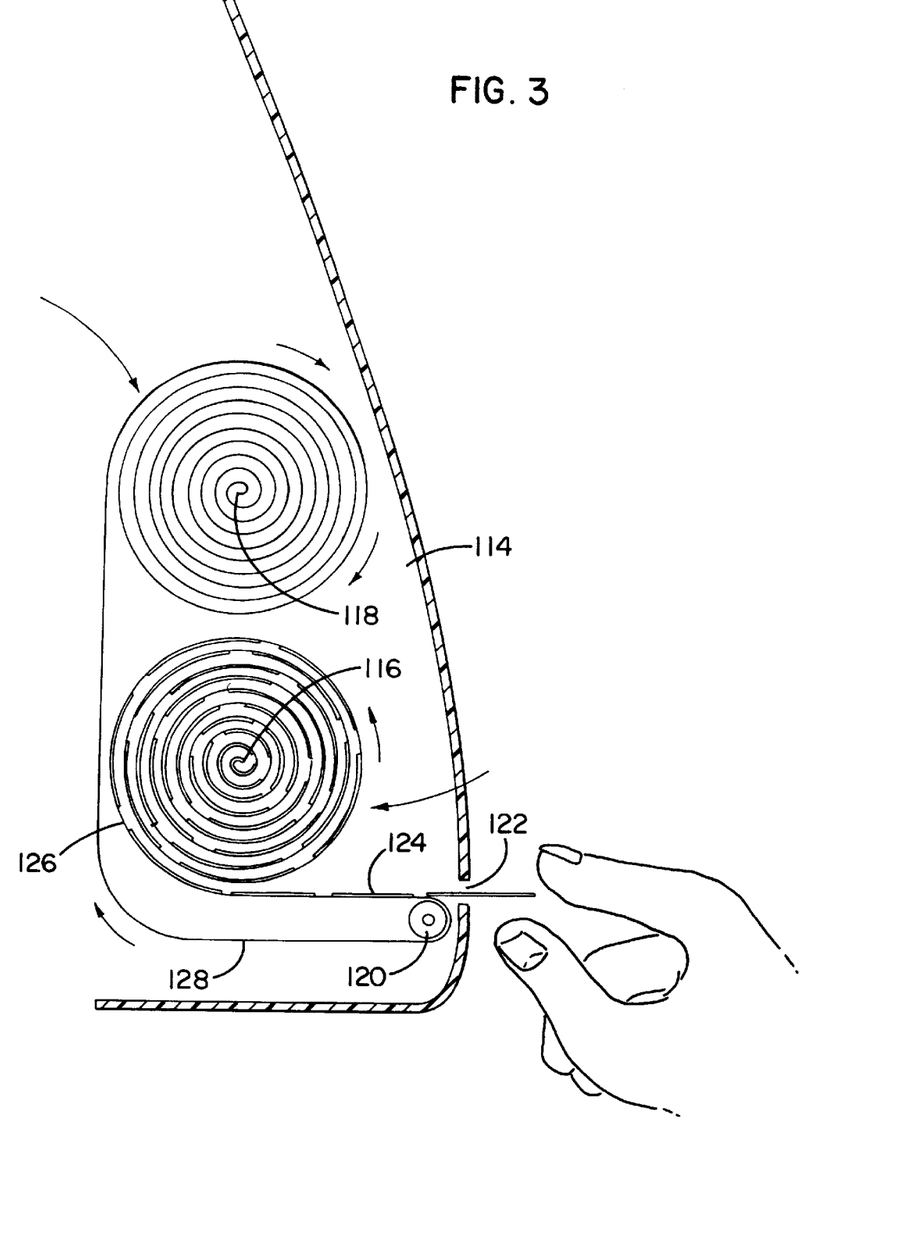
FIG. 3 illustrates a sticker dispenser for dispensing stickers according to the invention.

Referring to FIG. 2B, the learning toy apparatus 100 is shown in a side view. The housing 102, as can be seen includes a forward projecting section which is used to support and house the keyboard 104 and the speaker 106 and a raised portion 113 for holding a sticker dispenser 114 (FIG. 3). As described earlier, the keyboard 104 is a standard "QWERTY" keyboard wherein each key includes a key top and rubber or plastic key which, when depressed, presses a connector on one or more keyboard contacts within the housing 102, thereby closing the circuit and registering a signal for the particular key being depressed.

Referring to FIG. 3, a sticker dispenser 114 is shown which is installed in the raised portion 113 of the housing 102. The sticker dispenser 114 includes a feed reel 116, a take-up reel 118, a guide roller 120 and an aperture 122 that corresponds in proximity to the aperture 110. The feed reel 116 accepts a roll of stickers 126 having, for example, up to one-hundred stickers 124. Each sticker 124 has its own backing material to enable each sticker 124 to be saved and reused. Each sticker 124 is attached to a continuous length of sticker dispensing strip 128 that enables the stickers to be easily dispensed. The sticker dispensing strip 128 is threaded over the guide roller 120 and onto the take-up reel 118. As shown, the sticker 124 and the sticker dispensing strip 128 is fed from the feed roller 116.

As the sticker 124 is dispensed, the sticker dispensing strip 128 is wound on the take-up reel 118. As can be seen, the sticker dispensing strip 128, when pulled at a predetermined angle over the feed roller 120, causes the sticker 124 to automatically peel of the sticker dispensing strip 128 and project through the aperture 122. The sticker 124 may then be grasped by the user as it protrudes from the sticker dispenser aperture 110. It is to be noted that the angle at which the dispensing strip 128 is pulled to release a sticker 124 will vary according to the stiffness of the sticker material and the strength of the adhesive holding the sticker 124 to the dispensing strip 128.

A particular advantage of the sticker dispenser 114 is that the entire mechanism off the dispenser 114 is available as a replacement cartridge to enable quick removal and replacement of empty cartridges. The sticker dispenser still includes the feed roller 116, take-up roller 118 and the guide roller 120, along with a roll 126 of stickers, but is in the form of a cartridge. Thus, upon the sticker supply being exhausted, the user simply opens the housing 102 and inserts a new cartridge after extracting the old one.

It is well known that most children enjoy playing with stickers. Therefore, a reward system that provides stickers, such as in the present invention, motivates the child to repeatedly play the learning game to earn more stickers, thereby facilitating learning in the process. Accordingly, the stickers 124 are available in several configurations. In a first configuration, each sticker has one or more independent patterns or shapes, such as stars, circles, squares, etc. In a second configuration, as is described in detail below, each sticker is a portion of a larger picture. As such, the sticker pieces must be fitted together in a particular manner to complete the picture, such as in a puzzle. For example, fifty stickers from the sticker roll 126 may be required to form one entire picture.

Figure 4:
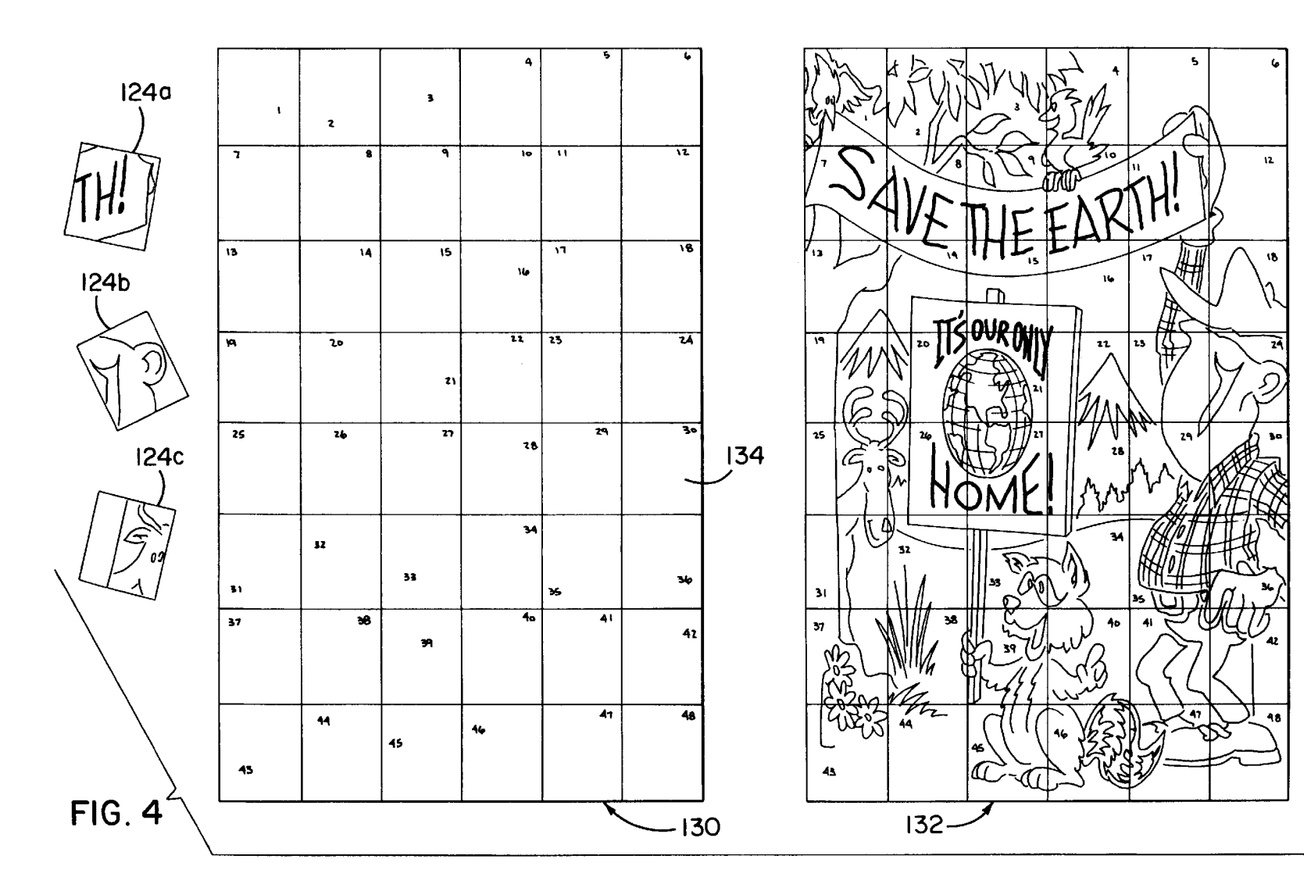
FIG. 4 illustrates exemplary stickers and templates for receiving one or more of the dispensed stickers.

Referring to FIG. 4, the learning toy is shown wherein the stickers 124a–124c, for example, are used in completing a puzzle type game. In particular, a template 130 is provided having a grid of boxes, such as box 134, wherein each box contains an unique indicia, such as a number. Each of the stickers 124a–124c being dispensed also has unique indicia printed upon it that corresponds to the indicia on the box. Thus, a child may match the indicia on the sticker to the particular box on the template 130 in which it is to be placed. Accordingly, as each sticker is awarded, the child can then match the sticker to the appropriate number on the box and place the sticker in the appropriate box. A particular advantage of such a system is that the child slowly sees a picture being created from where only a black and white numbered grid previously could be seen. Thus, the child is motivated by a sense of curiosity to repeatedly play the games in order to be awarded a new sticker, thereby building skills and learning in the process. Similarly, in a variation of the puzzle type game described above, the indicia on each sticker includes both a number and a portion of a picture. Accordingly, a template is provided having a grid imprinted upon it, including numbers for each individual box and the complete picture, separated by grid lines. In this case, however, the picture is provided to further help guide the child to the location of where a sticker is be placed. In particular, such a system may be used wherein the child may require additional visual guidance in the placement of the awarded stickers or where the child is unable to read numbers.

Figure 5:
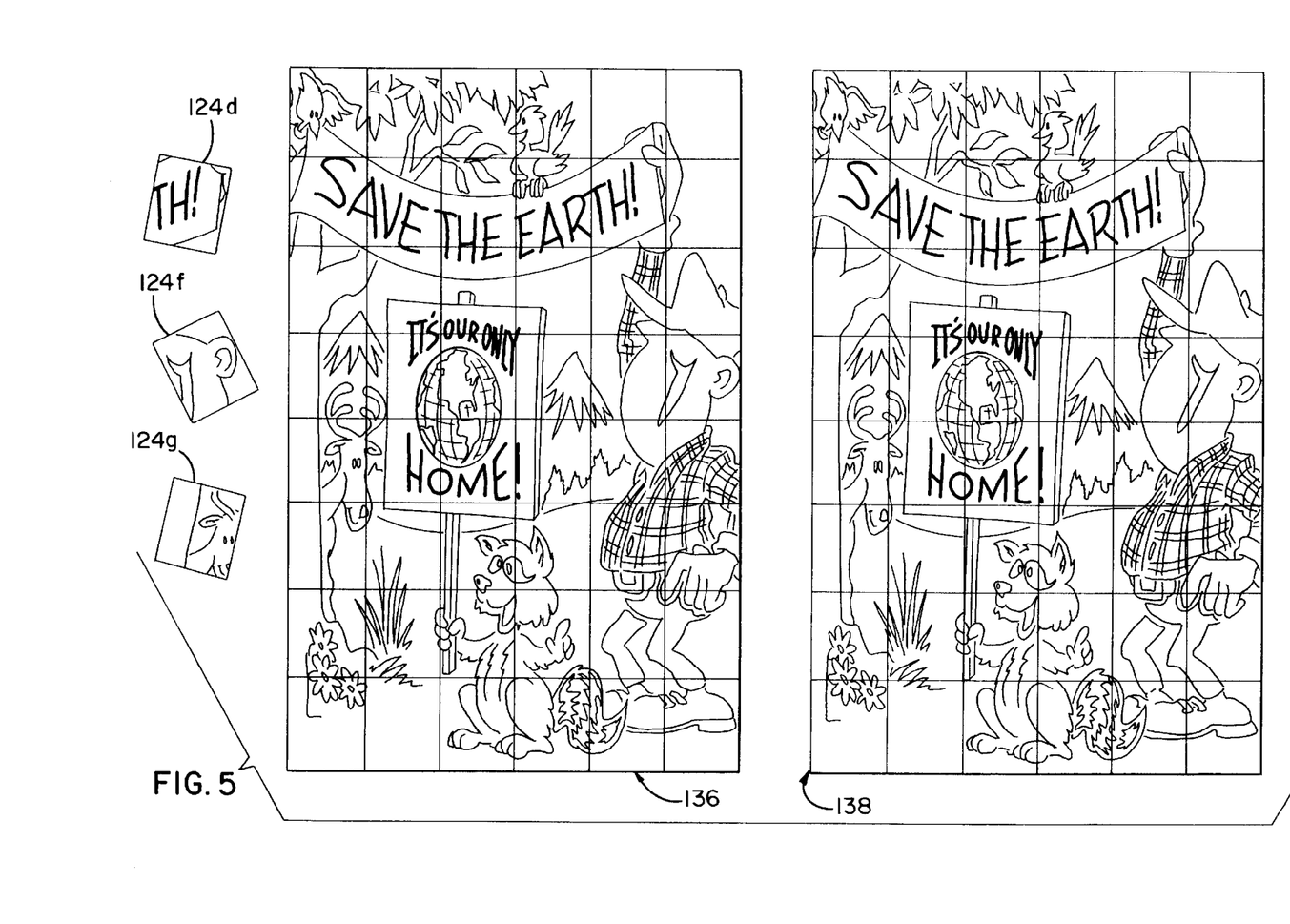
FIG. 5 illustrates a second template for receiving the dispensed stickers in accordance with the present invention.

Referring to FIG. 5, in another embodiment of the puzzle type game, templates 136, 138 are shown wherein the indicia is a picture that is divided into a grid, as described above, but has no associated numbers printed within each grid box. In such an instance, the sticker dispenser provides stickers that have portions of a picture that are matched to the particular portion of the grid containing a corresponding picture portion. Number reading skills are therefore not required. As shown, in a particular implementation of the embodiment, the template 136 has an imprinted grid having a black and white picture, such that the child is required to compare the stickers 124d–124f, for example, to the black and white picture imprinted upon the template Alternatively, the template 138 provides a picture that is in full color. Such a picture may better hold the attention of relatively younger children.

Figure 6:
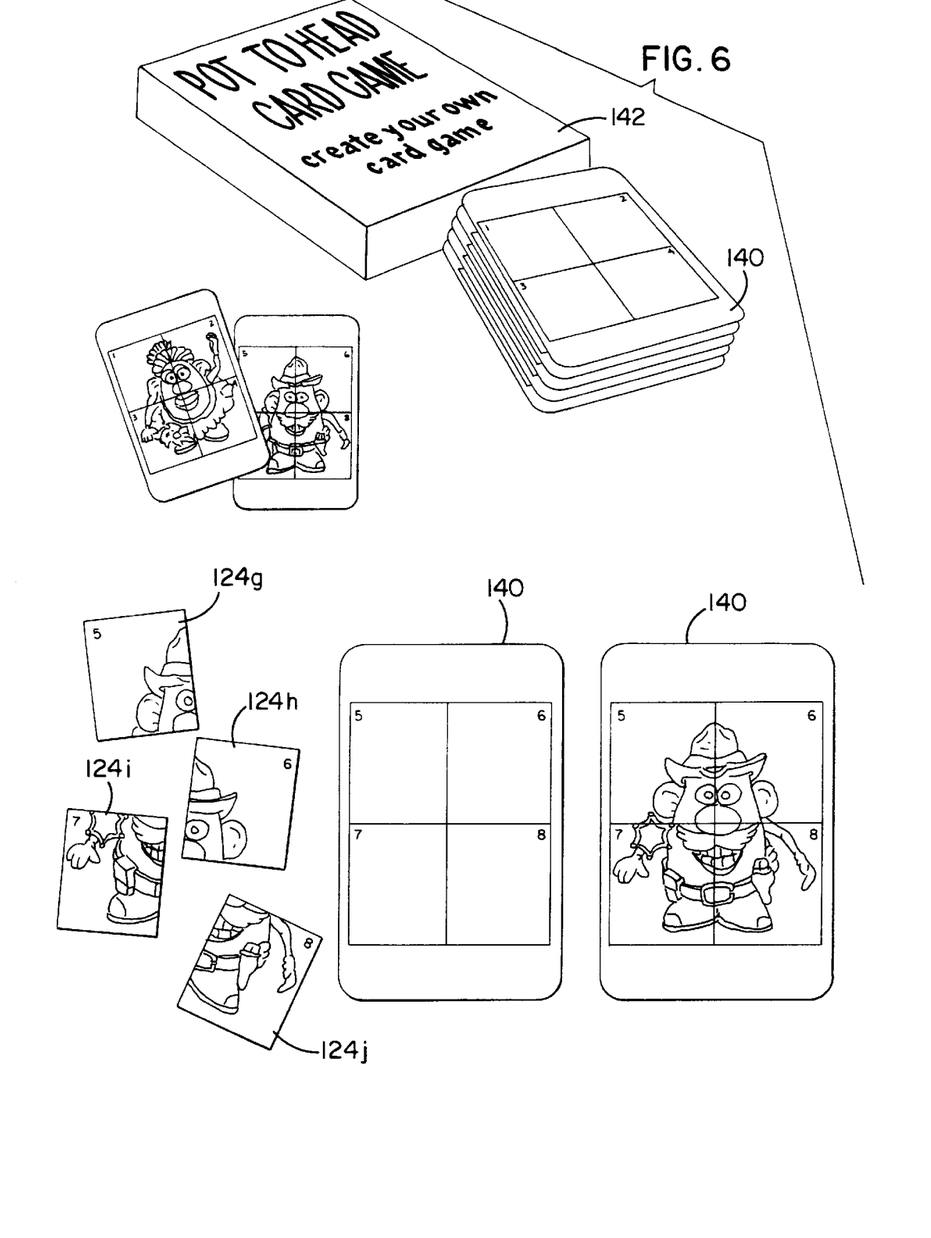
FIG. 6 illustrates a third template for receiving stickers in accordance with the present invention.
Figure 7A:
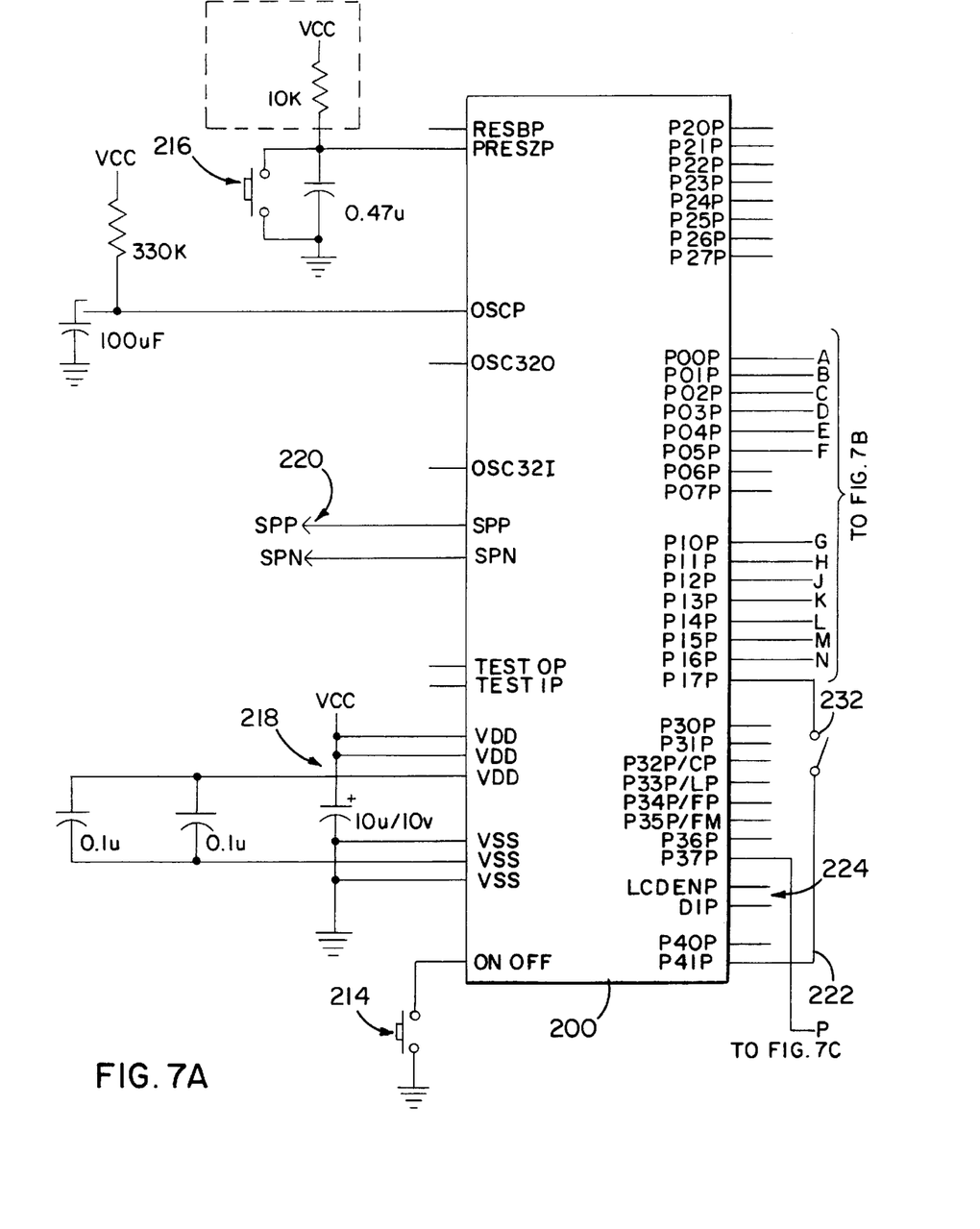
FIGS. 7A–7E are a partial block diagrams of a microcontroller according to the invention.
Figure 7B:
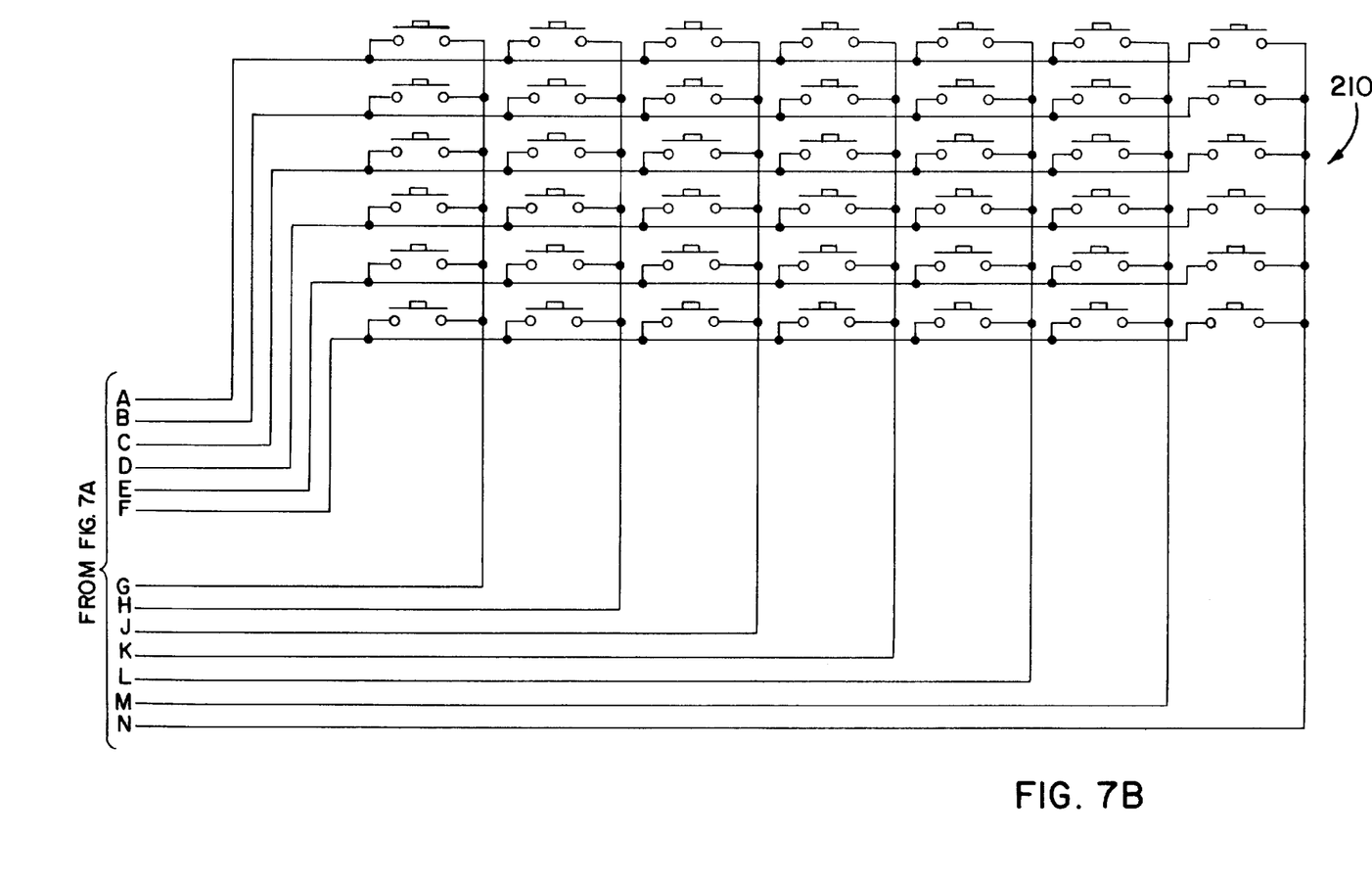
Figure 7C:
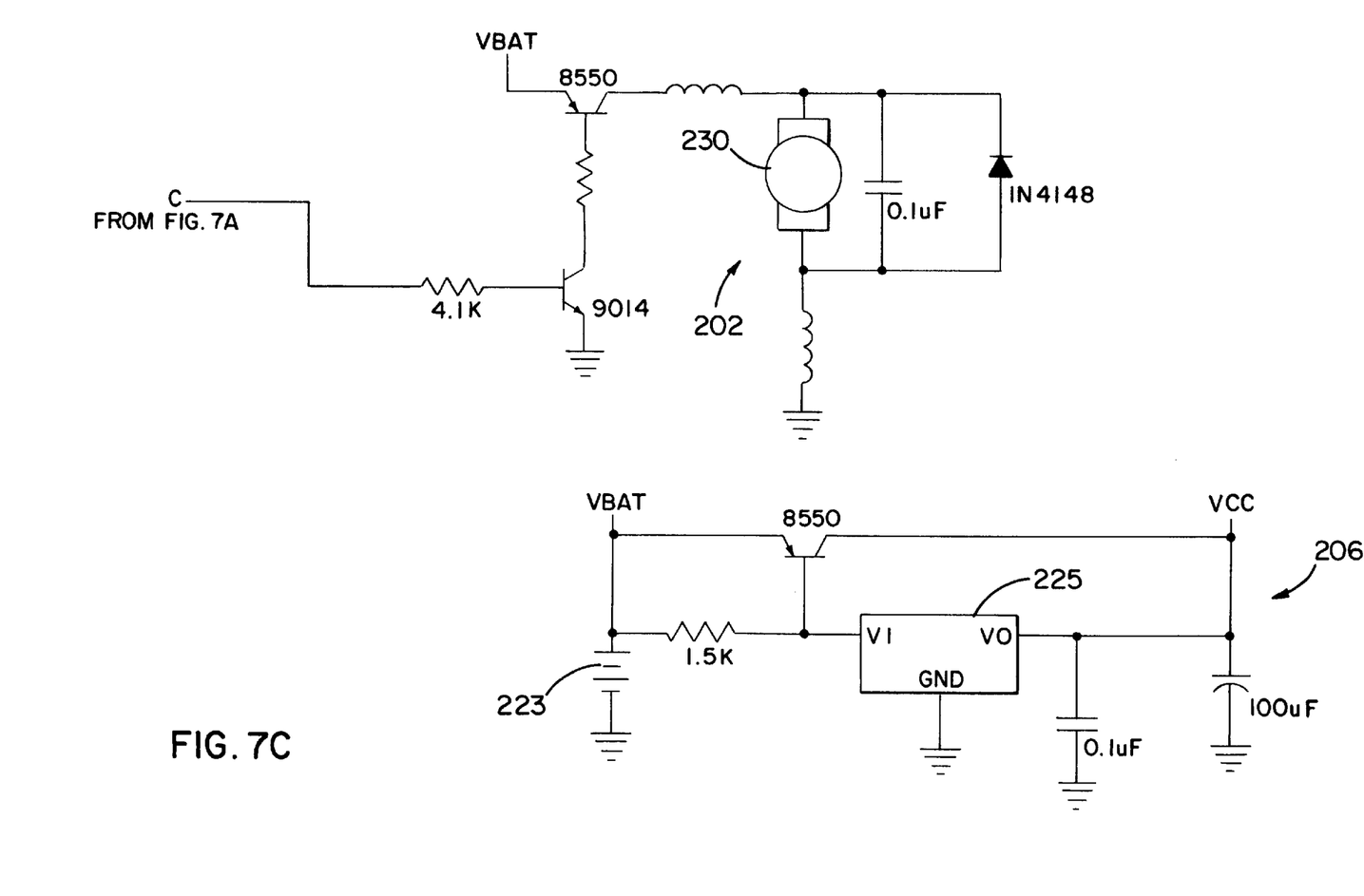
Figure 7D:
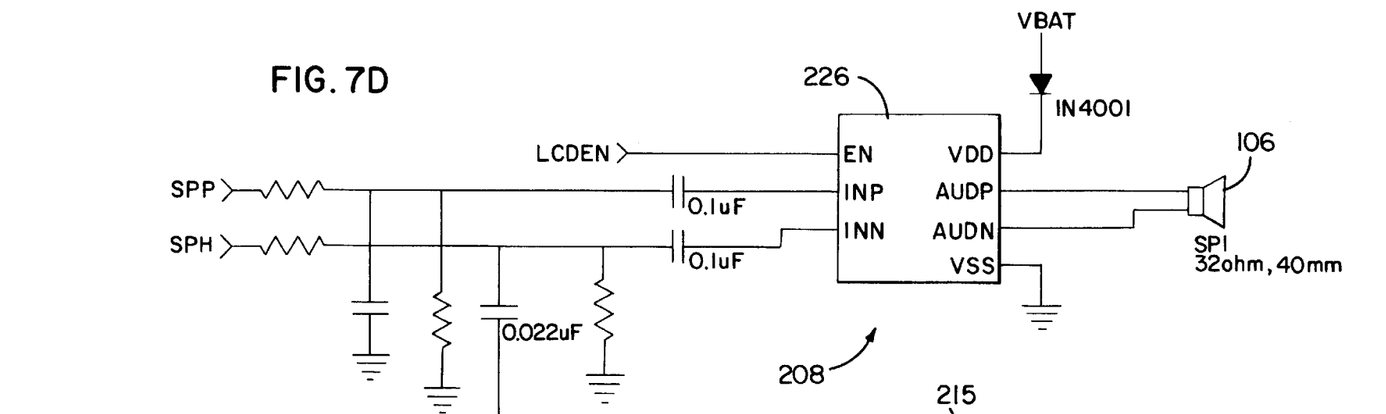
Figure 7E:
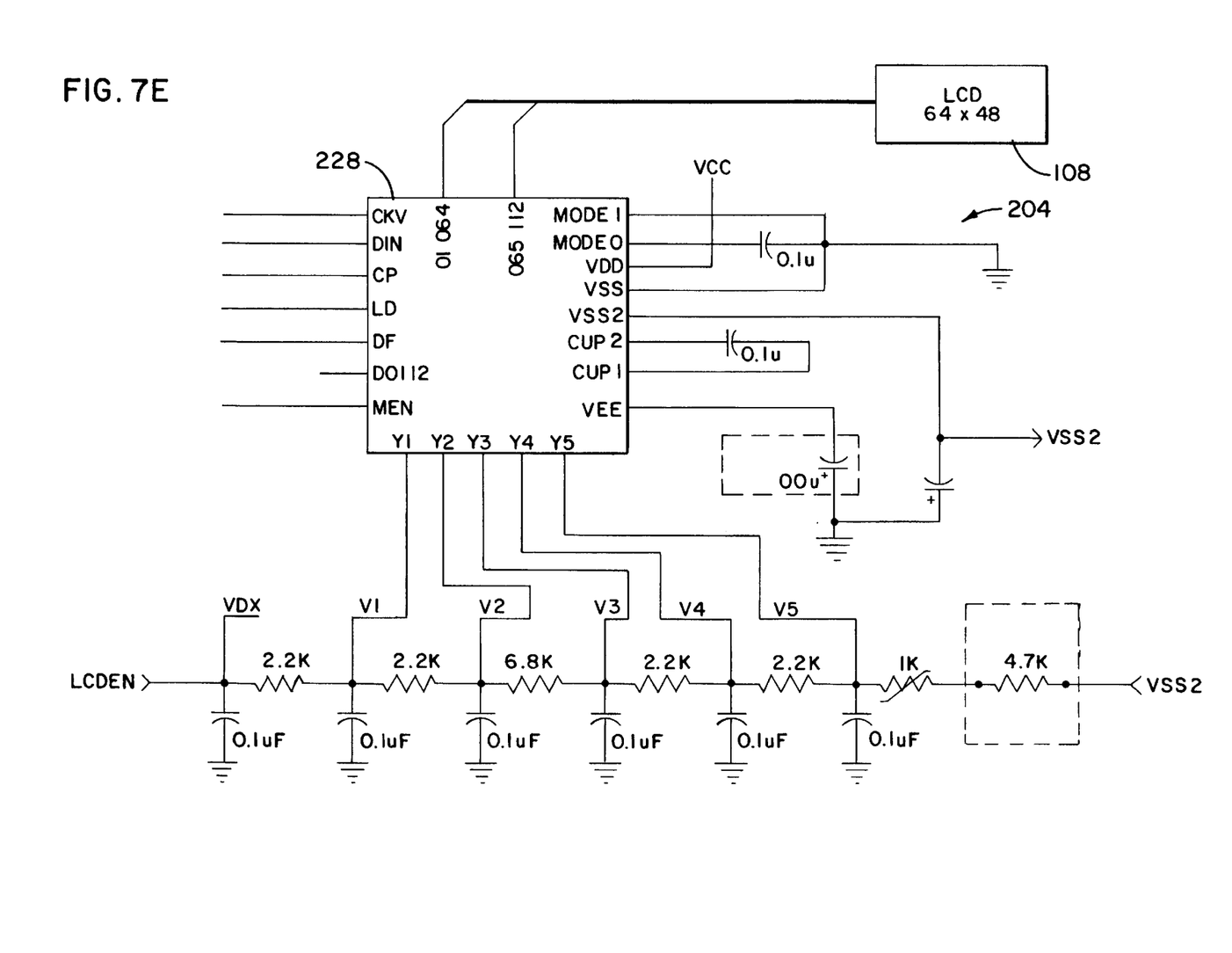

Referring to FIG. 6, the system is shown wherein the dispensed stickers may be used to create user-designed custom playing cards. Children are then able to use the playing cards to design their own card games. Accordingly, several playing card sized templates 140 may be provided in a box 142, in a manner similar to a deck of adult playing cards. Similar to the puzzle type games described above, the templates 140 are available in the variations described above. As shown, each template includes a small grid such that relatively fewer stickers are required to complete a picture Thus, a child, after filling several of the templates with stickers, is able to play a card game.

Figure 8:
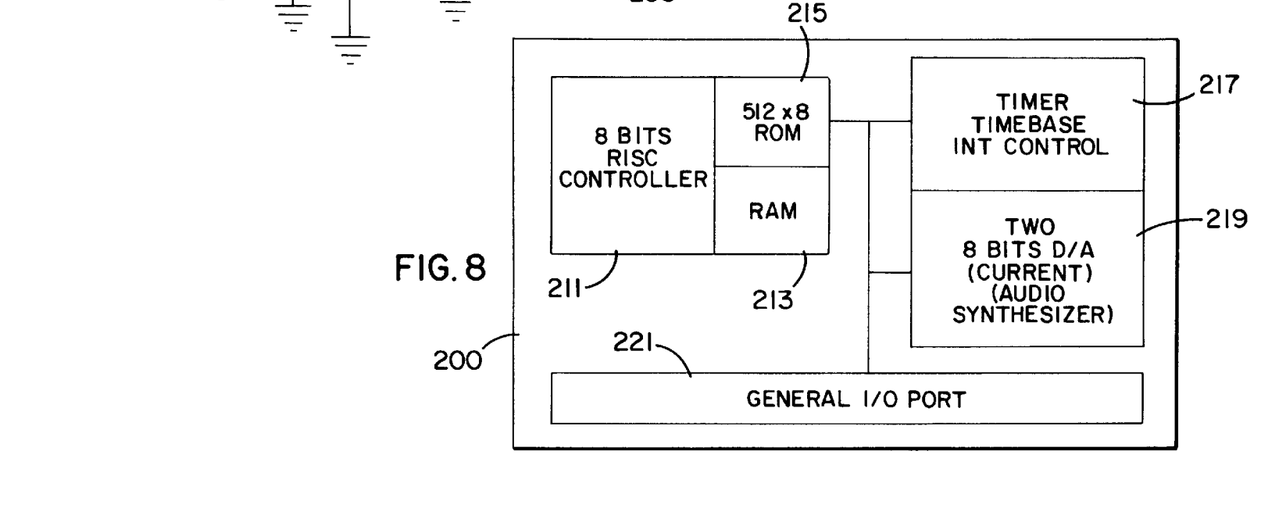
FIG. 8 is a schematic of the circuitry for a learning toy according to the invention.

FIGS. 7A–7E are a schematic of the electronic circuitry of the learning device 100. The processor 200 is shown as a microprocessor model SP512 available from SunPlus Company of Korea, but it should be apparent to those skilled in the art that other microprocessors and controllers may be used as well. The processor 200 controls operation of the various components of the electronic game. As shown in FIG. 8, the processor 200 is a general purpose processor, and includes an 8-bit RISC controller 211, a read only memory (ROM) 215 for storing the program used in the learning toy apparatus, and a random access memory (RAM) 213. The RISC controller 210, ROM 215 and RAM 213 are connected to a controller 217 that is used to provide a timer, time based and interrupt control signals. In addition, two 8-bit digital to analog (D/A) converters 219 provide audio synthesis to provide voice output from the speaker 106. A general input/output port 221 is also provided to enable input from the keyboard 104 and output to the speaker 106 and LCD 108.

Further referring to FIGS. 7A–7E, it can be seen that the microprocessor 200 is connected to keyboard input circuitry 210 and controls a motor controller 202, an audio amplifier 208, and a display controller 204. A power supply 206 is also provided to supply the power from the batteries to the learning toy apparatus and its circuits.

The power supply 206 includes one or more batteries 223, such as four 1.5 volt AA-type batteries for providing power to the system. An internal voltage regulator 225, such as the HT1038 by Hitachi, is used to supply the appropriate voltage necessary to operate the apparatus.

The microprocessor 200 receives power at the power supply input section 218 from the power supply 206. The power button 103 on the apparatus 100 housing 102 is connected to the power switch 214 at the microprocessor 200. The switch 214 is a double pull double throw switch for coupling the battery power at the power supply 206 to the apparatus 100 such that the on-off control is grounded when the switch is in the off position. A reset button 216 is provided to initialize the microprocessor 200 and clear the RAM 213.

Audio outputs 220 from the processor 200 are coupled to an audio effects processor 226 to enable sound output at speaker 106. A wide variety of audio effects chips may be used to provide different voices and audio effects, including the SunPlus SPY0012A. The voices and audio effects include spoken questions or music generated during game play. The audio also includes effects for answers that are answered correctly and incorrectly.

Display output 224 from the processor 200 is coupled to an LCD control processor 224 for providing visual output on the LCD display 108. The display controller may be one of a variety of different controllers, including the SunPlus SPLD 112A. The LCD display may be any conventionally available LCD screen capable of displaying 64×48 characters. The LCD display Is used to display the letters, numbers and shapes for the different games that may be played.

As mentioned above, the keyboard 104 is used to enter user input to the processor 200 in response to questions and activities. The keyboard contacts 210 within the apparatus housing 102 are connected to the general input/output ports on the processor 200. As such, when the user presses a key or inputs a sequence of keyboard inputs, the processor 200 receives a signal corresponding to the particular keys being pressed. The processor 200 stores the received key press signals and then processes them to determine whether the particular key or keys pressed in response to a presented question are correct The motor control circuit 202 is provided to activate a motor 230 when the apparatus 100 is preparing to award a sticker 124. In particular, as described above, when a predetermined number of questions has been answered correctly and the counter reaches, for example, 5, then the processor 200 sends a signal to the motor controller 202 to activate the motor 230 for a fixed duration. This advances the roil of stickers 126 to the point that a sticker 124 protrudes from the apparatus housing 102 such that a user may grasp the sticker. in addition, a feedback loop 222 is used as a motor sensor to determine the length of time that the motor is actually in the on state. When the motor turns on, the switch 232 closes. Once the motor 230 completes its operation, the switch 232 opens. The processor 200 measures the duration that the switch 232 was closed and calculates the exact amount that the sticker roll 126 advanced. The information is subsequently used by the processor 200 to periodically adjust the amount of time the motor 230 is activated. Thus, the stickers 124 will protrude the same amount during every time.

Obviously, many modifications and variations of the present invention are possible in light of the above teachings. Thus, it is to be understood that, within the scope of the appended claims, the invention may be practiced otherwise than as specifically described above.

What is claimed is:

1. An apparatus for facilitating learning using a reward system, comprising:
   an electronic controller;
   at least one switch coupled to said controller for generating one or more game functions, each game function generating at least one query requiring a response;
   a housing for enclosing said controller;
   an input device coupled to said controller for enabling a response to be entered in response to said query, said controller determining whether said entered response is acceptable; and
   a sticker dispenser disposed within said housing for dispensing a sticker when said entered response is acceptable.

2. The apparatus of claim 1, wherein said sticker dispenser includes a feeding reel and a take-up reel, said feeding reel for accepting a roll of stickers having a backing material and said take-up reel for receiving and forming a roll from said sticker backing material.

3. The apparatus of claim 1, wherein said sticker dispenser includes a guide roller for guiding said sticker roll from said feeding reel to said take-up reel.

4. The apparatus of claim 3, wherein said guide roller is positioned such that said sticker automatically peels off said backing material when said sticker roll is bent at a predetermined angle over said guide roller.

5. The apparatus of claim 4, wherein said housing includes an opening, said opening for enabling a sticker to protrude outwardly from said opening when said sticker is peeled from its backing material.

6. The apparatus of claim 1, wherein said sticker dispenser is removably disposed within said housing.

7. The apparatus of claim 1, wherein said sticker dispenser is a user replaceable cartridge.

8. An apparatus for facilitating learning using a reward system, comprising:
   an electronic controller;
   at least one switch coupled to said controller for generating one or more game functions, each game function generating at least one query requiring a response;
   a housing for enclosing said controller;
   an input device coupled to said controller for enabling a response to be entered in response to said generated problem, said controller determining whether said entered response is acceptable; and
   a sticker dispenser disposed within said housing for dispensing stickers when said entered response is acceptable, said sticker dispenser having a plurality of stickers having various identifying indicia for forming an image when said stickers are arranged in a predetermined manner.

9. The apparatus of claim 6, further including a template for receiving said stickers.

10. The apparatus of claim 7, wherein said template includes indicia corresponding to indicia on said stickers.

11. The apparat us of claim 8, wherein said indicia includes alphanumeric text.

12. The apparatus of claim 7, wherein said indicia includes images.

13. The apparatus of claim 6, wherein said sticker dispenser is a removable cartridge having a feeding reel and a take-up reel, said feeding reel for accepting a roll of stickers having a backing material and said take-up reel for receiving and forming a roll from said sticker backing material.

14. The apparatus of claim 13, wherein said cartridge includes a guide roller for guiding said sticker roll from said feeding reel to said take-up reel.

15. The apparatus of claim 13, wherein said sticker cartridge may be replaced by removing said existing cartridge and replacing with a new cartridge.

16. The apparatus of claim 13, wherein said guide roller is positioned such that said sticker automatically peels off said backing material when said sticker roll is bent at a predetermined angle over said guide roller.

17. A method for facilitating learning using a reward system, comprising:
   providing an electronic controller;
   coupling at least one switch to said controller for generating one or more game functions, each game function generating at least one query requiring a response;
   enclosing said controller in a housing;
   coupling an input device to said controller for enabling a response to be entered in response to said query, said controller determining whether said entered response is acceptable; and dispensing a sticker from within said housing when said entered response is acceptable.

18. A method for facilitating learning using a reward system, comprising:

providing an electronic controller;

coupling at least one switch to said controller for generating one or more game functions, each game function generating at least one query requiring a response;

enclosing said controller in a housing;

coupling an input device to said controller for enabling a response to be entered in response to said generated problem, said controller for determining whether said entered response is acceptable; and providing a sticker dispenser disposed within said housing for dispensing stickers when said entered response is acceptable, said sticker dispenser having a plurality of stickers having various identifying indicia for forming an image when said stickers are arranged in a predetermined manner.

* * * * *